(12) United States Patent
Wu et al.

(10) Patent No.: US 11,737,186 B1
(45) Date of Patent: Aug. 22, 2023

(54) LED BULB CONTROL DEVICE AND LED BULB ADDRESS PROGRAMMING METHOD

(71) Applicant: ZHANGZHOU GO WIN LIGHTING CO., LTD, Zhangzhou (CN)

(72) Inventors: Qingan Wu, Zhangzhou (CN); Bihai Wang, Zhangzhou (CN); Yaying Huang, Zhangzhou (CN)

(73) Assignee: ZHANGZHOU GO WIN LIGHTING CO., LTD, Zhangzhou (CN)

( * ) Notice: Subject to any disclaimer, the term of this patent is extended or adjusted under 35 U.S.C. 154(b) by 0 days.

(21) Appl. No.: 17/857,029

(22) Filed: Jul. 3, 2022

(30) Foreign Application Priority Data

May 30, 2022 (CN) .......................... 202210601768.9

(51) Int. Cl.
*H05B 45/50* (2022.01)
*H05B 45/24* (2020.01)
*H05B 45/46* (2020.01)

(52) U.S. Cl.
CPC ............. *H05B 45/24* (2020.01); *H05B 45/46* (2020.01); *H05B 45/50* (2020.01)

(58) Field of Classification Search
CPC ........ H05B 45/10; H05B 45/20; H05B 45/24; H05B 45/46; H05B 45/50; H05B 47/10
See application file for complete search history.

(56) References Cited

U.S. PATENT DOCUMENTS

2017/0196055 A1* 7/2017 Jao ...................... H05B 45/395

* cited by examiner

*Primary Examiner* — Jimmy T Vu

(57) ABSTRACT

An LED bulb control device includes a rectifier unit, connected to an external power supply to convert an alternating current into a direct current; a DC-DC unit, connected to the rectifier unit; a signal sampling unit, connected to the rectifier unit or the external power supply for counting a number of changes in a cycle and a cycle length of the alternating current or a control signal pulse to provide a synchronization signal and acquire a control signal input by an external controller; a control unit, connected to the signal sampling unit for receiving the synchronization signal and/or the control signal output by the signal sampling unit; a MCU power supply unit, connected to the DC-DC unit and the control unit respectively for supplying power to the control unit; and an LED assembly connected to the DC-DC unit and the control unit respectively.

10 Claims, 4 Drawing Sheets

US 11,737,186 B1

LED BULB CONTROL DEVICE AND LED BULB ADDRESS PROGRAMMING METHOD

CROSS REFERENCE TO RELATED APPLICATIONS

This application is based upon and claims priority to Chinese Patent Application No. 202210601768.9, filed on May 30, 2022, the entire contents of which are incorporated herein by reference.

TECHNICAL FIELD

The present disclosure relates to the technical field of lamp control devices and lamp beads, and in particular, to an LED bulb control device and an LED bulb address programming method.

BACKGROUND

As a significant lighting means, light bulbs are widely used in indoor decoration, making atmosphere in public place, etc. However, decorative light bulb assemblies are mostly composed of multiple LED bulbs connected in series, parallel or in combination of both. LED bulbs are widely used in various decorative bulb assemblies owing to its long service life, environmental friendly characteristic, high light efficiency, and so on. Especially, LED bulbs are often equipped with control chips to increase the flexibility and diversity of opening and closing control of LED bulbs. To make the LED bulbs run under a synchronous control to follow certain rules or run under an asynchronous control, so as to make an ideal atmosphere, usually, lamp designers will match the light control device with the corresponding functions and desired effects, such as light intensity adjustment, sequential illumination of lights, etc.

In traditional solutions, control units are configured according to the number of LED light beads. However, since the multiple control units are not synchronized, the responses of the LED lights respectively controlled by the control units are also not synchronized, so that as time goes on, the timing deviation of different control units accumulates, the lighting of the light bulbs becomes irregular. Although multiple LED bulbs controlled by one control chip already exist in the market, once the controller connected by the user is removed, the LED lights will work in disorder, and automatic adjustment to light in order cannot be realized.

Additionally, in the traditional LED light unit, the addresses of corresponding light bulbs may only be programmable for a single time, which requires the control unit to be programmed according to the addresses of the LED bulbs. The address programming should be completed before installation of the LED bulbs, and the LED bulbs should be mounted according to the set sequence of the programmed address to be in the right place. Due to the set installation positions and set address programming method, when in use, if one or more LED bulbs are found to be failed, the entire LED light assembly may not work normally. However, there is some kind of technical threshold in getting the address code of the corresponding LED bulb by the user, and it is difficult for maintaining the LED light assembly during replacement of the failed bulbs. Therefore, there is an unmet need to improve the convenience and stability in controlling the LED bulbs on the LED light assembly, and provide a more user-friendly and more flexible LED bulb address programming method. It is also a technology urgently needed in this field.

SUMMARY

In view of the above problems, the present disclosure provides an LED bulb control device and an LED bulb address programming method which have high reliability in implementation, high synchronization efficiency, high stability in use, high flexibility in operation, and are user-friendly.

In order to realize the above-mentioned technical purpose, the technical solution adopted by the present disclosure is as follows.

An LED bulb control device, including:

a rectifier unit, connected to a live line and a neutral line of an external power supply, wherein the rectifier unit is configured to convert an alternating current into a direct current;

a DC-DC unit, connected to the rectifier unit;

a signal sampling unit, connected to the rectifier unit or the external power supply for counting a number of changes in a cycle and a cycle length of the alternating current or a control signal pulse to provide a synchronization signal and acquire a control signal input by an external controller;

a control unit, connected to the signal sampling unit for receiving the synchronization signal and/or the control signal output by the signal sampling unit;

a MCU power supply unit, connected to the DC-DC unit and the control unit respectively for supplying power to the control unit; and an LED assembly, wherein the LED assembly includes one or more LED units, the LED assembly is connected to the DC-DC unit and the control unit respectively, and is controlled by the control unit.

As a possible implementation, further, a fuse F1 and a current-limiting resistor R1 are respectively connected to the live line and the neutral line between the external power supply and the rectifier unit. The rectifier unit is a rectifier bridge DB1, and a first pin and a third pin of the rectifier bridge are respectively connected to the live line and the neutral line of the external power supply. Two ends of the fuse F1 are connected to a line connecting the first pin of the rectifier bridge DB1 and the external power supply. Two ends of the current-limiting resistor R1 are connected to a line connecting the third pin of the rectifier bridge DB1 and the external power supply. A fourth pin of the rectifier bridge DB1 is grounded, and a second pin of the rectifier bridge DB1 is respectively connected to the DC-DC unit and the signal sampling unit.

As a preferred implementation, the DC-DC unit includes a chip U1, a resistor R5, a capacitor C2, an inductor L1, a diode D1, a diode D2, and an electrolytic capacitor C3. A first pin VDD of the chip U1 is connected to a first terminal of the capacitor C2 and a cathode of the diode D2, a second pin DRAIN of the chip U1 is connected to the second pin of the rectifier bridge DB1, a third pin CS of the chip U1 is connected to a first terminal of the resistor R5, and a second terminal of the resistor R5 is respectively connected to a second terminal of the capacitor C2, a first terminal of the inductor L1, and a cathode of the diode D1. An anode of the diode D1 and a cathode of the electrolytic capacitor C3 are both grounded, and an anode of the diode D2 and an anode of the electrolytic capacitor C3 are connected to a second terminal of the inductor L1. The second terminal of the inductor L1 is also connected with the MCU power supply unit and the LED assembly.

As a preferred implementation, the line connecting the DC-DC unit to the MCU power supply unit and the LED assembly is also provided with a diode D4 and a resistor R4, successively. An anode of the diode D4 is connected to the DC-DC unit, a cathode of the diode D4 is connected to a first terminal of the resistor R4, and a second terminal of the resistor R4 is connected to the MCU power supply unit and the LED assembly, respectively.

As a preferred implementation, the control unit includes a control chip U2, and the MCU power supply unit includes a zener diode ZD1 and a capacitor C4. A first pin VDD of the control chip U2, a cathode of the zener diode ZD1 and a first terminal of the capacitor C4 are all connected to the second terminal of the resistor R4. A second pin GND of the control chip U2, an anode of the zener diode ZD1 and a second terminal of the capacitor C4 are all grounded. The second terminal of the resistor R4 is also grounded.

In addition, a third pin SYN of the control chip U2 is connected to the signal sampling unit, the control chip U2 further includes an output pin, and the control chip is connected to the LED assembly through the output pin.

As a preferred implementation, the signal sampling unit includes a resistor R2, a resistor R3 and a capacitor C3. A first terminal of the resistor R3 is connected to the second pin of the rectifier bridge DB1. A second terminal of the resistor R3, a first terminal of the resistor R2, and a first terminal of the capacitor C3 are all connected to the third pin SYN of the control chip U2. A second terminal of the resistor R2 and a second terminal of the capacitor C3 are both grounded.

As a preferred implementation, the LED assembly includes a plurality of LED units, a first end of each LED unit is connected to the second terminal of the resistor R4, and a second end of each LED unit is connected to the control chip U2.

In order to facilitate synchronous control, a quantity of the output pin of the control chip U2 is the same as a quantity of the LED unit, and the output pin is connected to the LED unit in a one-to-one correspondence.

In view of the color combination of the LED units, according to one implementation, the LED units may be single-color LED units or mixed-color LED units, the mixed LED units may be RGB color LED units or RGBW color LED units, and each LED unit may include more than one LED sub-unit. The plurality of LED units of the LED assembly may be connected in series, parallel or in combination of both.

As a preferred implementation, a diode D3 is further provided between the DC-DC unit and the rectifier unit, and an anode of the diode D3 is connected to the second pin of the rectifier bridge DB1 of the rectifier unit. A cathode of the diode D3 is connected to the second pin DRAIN of the chip U1 of the DC-DC unit.

As a preferred implementation, the LED assembly further includes a resistor R6, a first terminal of the resistor R6 is respectively connected to the first end of each LED unit, and a second terminal of the resistor R6 is connected to the second terminal of the resistor R4.

As a preferred implementation, the product model number of the chip U2 is FT60F021-RB.

Based on the above-mentioned hardware structure, the present disclosure further provides an LED bulb address programming method, which is applied to an LED assembly having more than one LED bulb, the LED assembly is connected with a control device, and the LED bulb address programming method includes the following steps:

S01. connecting the control device of the LED assembly to a power supply to complete an activation;

S02. installing LED bulbs on the LED assembly;

S03. writing, by a control unit of the control device, an address code into each LED bulb installed on the LED assembly by looking up a table in response to an access signal created when the LED bulbs are installed on the LED assembly;

S04. creating a feedback signal and outputting the feedback signal after the address code is written into each LED bulb;

S05. receiving the feedback signal created by the LED bulb and confirming a presence of the address code of corresponding LED bulb.

As a preferred implementation, an address code table is pre-recorded in the control unit, and the address codes are correspondingly written into the LED bulbs according to a loading sequence of the LED bulbs.

As a preferred implementation, the address codes of the LED bulbs can only be written once or rewritable.

Since the lifespan of LED bulbs is restricted, one or more LED bulbs may fail after the LED assembly is used for a period of time. In this case, maintenance personnel usually needs to replace the faulty bulbs. When the old LED bulb is removed and replaced with a new LED bulb, there may be a change in the LED bulb's address code. In case that the address code of the new LED bulb is not the same as the old one, the program of the control unit of the LED assembly need to be updated, especially commands related to addresses needs to be adjusted accordingly, so as to keep pace with other bulbs after the replacement with new LED bulb. However, this method is relatively inefficient. In order to improve user-friendliness and reduce the chance to adjust the program of the control unit as much as possible, the present disclosure further provides a mechanism that can reserve the address codes for LED bulbs after replacement, so that the new LED bulbs can be used directly, details of the mechanism are described below.

A method for replacing an LED bulb, including the following steps:

(1) receiving a feedback signal indicating that an old LED bulb is removed from the LED assembly;

(2) in response to a reception of the feedback signal, acquiring an address code of the old LED bulb and reserving the address code for a predetermined duration;

(3) installing a new LED bulb on the LED assembly in a one-to-one correspondence with the old LED bulb, wherein the control unit of the control device writes the reserved address code of the old LED bulb into the corresponding new LED bulb in response to an access signal indicating that the new LED bulb is installed on the LED assembly;

(4) creating a feedback signal and outputting the feedback signal after a completion of writing the reserved address code into the new LED bulb;

(5) receiving the feedback signal created by the new LED bulb and confirming a presence of the address code of corresponding new LED bulb.

According to the above method, the faulty LED bulb is removed and new LED bulb is installed carrying the address code of the removed LED bulb. By doing so, a seamless transition of the new LED bulb installed on the LED assembly can be obtained to get ready for direct use without the need to update the control program of the LED assembly, thereby improving the efficiency of the LED bulb maintenance.

Additionally, in step (3), in response to the access signal indicating that the new LED bulb (the LED bulb for replacement of the faulty LED bulb) is installed on the LED assembly, the control unit also acquires the address code of the new LED bulb if it has one. Namely, the control unit will check whether the LED bulb has an address code that is written beforehand, if yes, the address code will be erased and the LED bulbs will each be assigned and written an address code successively by looking up a table. Otherwise, the LED bulbs will each get an address code directly and successively by looking up the table. In this case, when the LED bulb is written with an address code beforehand, the LED bulb should allow address code rewriting. While, for LED bulbs have no address code written beforehand, the LED may either allow address code only be written once or allow address code rewriting.

Based on the above-mentioned LED bulb address programming method, the present disclosure also provides an LED bulb address programming system, which includes:

a control device, configured to be connected to the LED assembly and connected to an external power supply, wherein to write the address code to the LED bulb, the control device is connected to the external power supply to complete an activation;

a control unit, integrated on or connected to the control device, configured to respond to an access signal indicating that the LED bulb is installed on the LED assembly;

a programming unit, configured to write an address code in the LED bulb installed on the LED assembly by looking up a table;

a signal feedback unit, configured to create and output a feedback signal after the address code is written into the LED bulb; and an address code verification unit, configured to receive the feedback signal created by the LED bulb and confirm a presence of address code of corresponding LED bulb.

Based on the above-mentioned LED bulb address programming method, the present disclosure also provides a computer-readable storage medium. The storage medium stores at least one instruction, program, code set, or instruction set, and the at least one instruction, one piece of program, one code set, or instruction set is loaded and executed by a processor to implement the above-mentioned LED bulb address programming method.

In addition, the present disclosure also provides an LED bulb address programming device, which includes the computer-readable storage medium described above.

Compared with the prior art, the present disclosure has the following advantages: in the present disclosure, the DC-DC unit is ingeniously connected to the rectifier unit, and the DC-DC unit is connected to the MCU power supply unit and the LED assembly. The main function of the DC-DC unit is to supply power for the MCU power supply unit and the LED assembly. By providing the DC-DC unit, the device of the present disclosure may better adapt to a wider range of voltage, because the DC-DC unit can provide a constant output voltage even though the input AC power varies in a wider range, so as to stabilize power supply for subsequent units and components. Additionally, according to the present disclosure, the signal sampling unit counts a number of changes in a cycle and a cycle length of the alternating current to provide a synchronization signal and acquire a control signal input by an external controller, which are then sent to the control unit for detection and recognition. The control unit determines whether there is a control signal from the external controller, and controls the automatic synchronization adjustment of the LED assembly according to the determination result, so that the LED units of the LED light assembly can synchronously work in a reliable and stable condition. Additionally, the present disclosure uses a diode D4 to prevent distortion of signal waveform caused by crosstalk between the external control signal and the external power supply. As a result, the stability and accuracy of controlling the LED assembly is improved. When it comes to the address programming mechanism of the LED bulbs, the present disclosure abandons the traditional solution where address codes are written into the LED bulbs first, then the LED bulbs are installed on the LED assembly according to the address codes. According to the present disclosure, measures are taken in response to a reception of the access signal indicating that the LED bulb is installed on the LED assembly. After the LED bulb is installed on the LED assembly, address code is written to corresponding LED bulb by way of table look-up. Upon a completion of the address programming, a feedback signal is created to indicate that the address programming is completed. In response to a reception of the feedback signal, a presence of the address code of corresponding LED bulb is verified according to the feedback signal, so as to complete the installation of the LED bulb and the address programming. Afterwards, the control unit can turn on or off the LED bulbs according to the address code of the LED bulb. The flexibility, convenience, and user-friendliness in installing the LED bulbs on the LED assembly of the present disclosure is greatly improved. Additionally, even when the LED bulb fails, the replacement and address reprogramming are easier, so the control of the LED bulbs is more flexible and maintenance of the LED assembly is simplified and more reliable.

BRIEF DESCRIPTION OF DRAWINGS

In order to clearly explain the embodiments of the present disclosure or the technical solutions in the prior art, the drawings that would be used in describing the embodiments or the prior art will briefly introduced below. Obviously, the drawings illustrated below merely include some of the embodiments of the present disclosure. For those of ordinary skill in the art, other drawings may be derived from these drawings without creative effort.

DETAILED DESCRIPTION OF THE EMBODIMENTS

The present disclosure will be described in detail with reference to the drawings and embodiments hereinafter. It should be noted that the embodiments described below are merely intended to illustrate the present disclosure rather than limit the scope of protection of the present disclosure. Likewise, the following embodiments merely cover part of the embodiments of the present disclosure rather than all. All other embodiments derived by a person of ordinary skill in the art based on the present disclosure without creative effort shall be considered as fall within the scope of the present disclosure.

Embodiment 1

Figure 1:
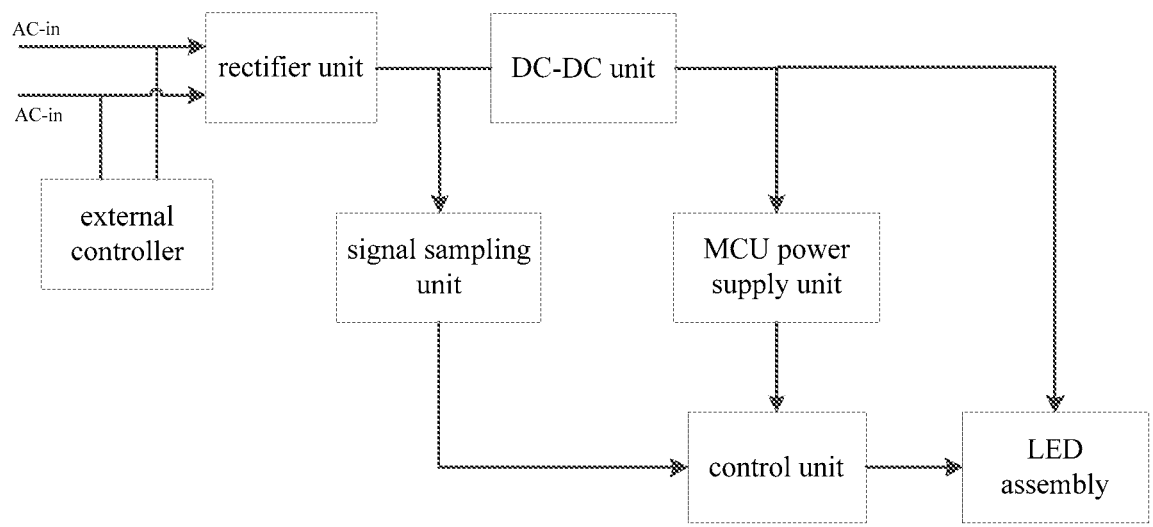
FIG. 1 is a schematic diagram briefly showing the connection relationship of various units of a device according to one embodiment of the present disclosure.

As shown in FIG. 1, the present embodiment provides an LED bulb control device, which includes:

a rectifier unit 1, connected to a live line and a neutral line of an external power supply, wherein the rectifier unit is configured to convert an alternating current into a direct current;

a DC-DC unit 2, connected to the rectifier unit 1;

a signal sampling unit 3, connected to the rectifier unit 1 for counting a number of changes in a cycle and a cycle length of the alternating current or a control signal pulse to provide a synchronization signal and acquire a control signal input by an external controller;

a control unit 4, connected to the signal sampling unit for receiving the synchronization signal and/or the control signal output by the signal sampling unit;

a MCU power supply unit 5, connected to the DC-DC unit 2 and the control unit 4 respectively for supplying power to the control unit 4; and an LED assembly 6, wherein the LED assembly 6 includes one or more LED units, the LED assembly 6 is connected to the DC-DC unit 2 and the control unit 4 respectively, and is controlled by the control unit 4.

Figure 2:
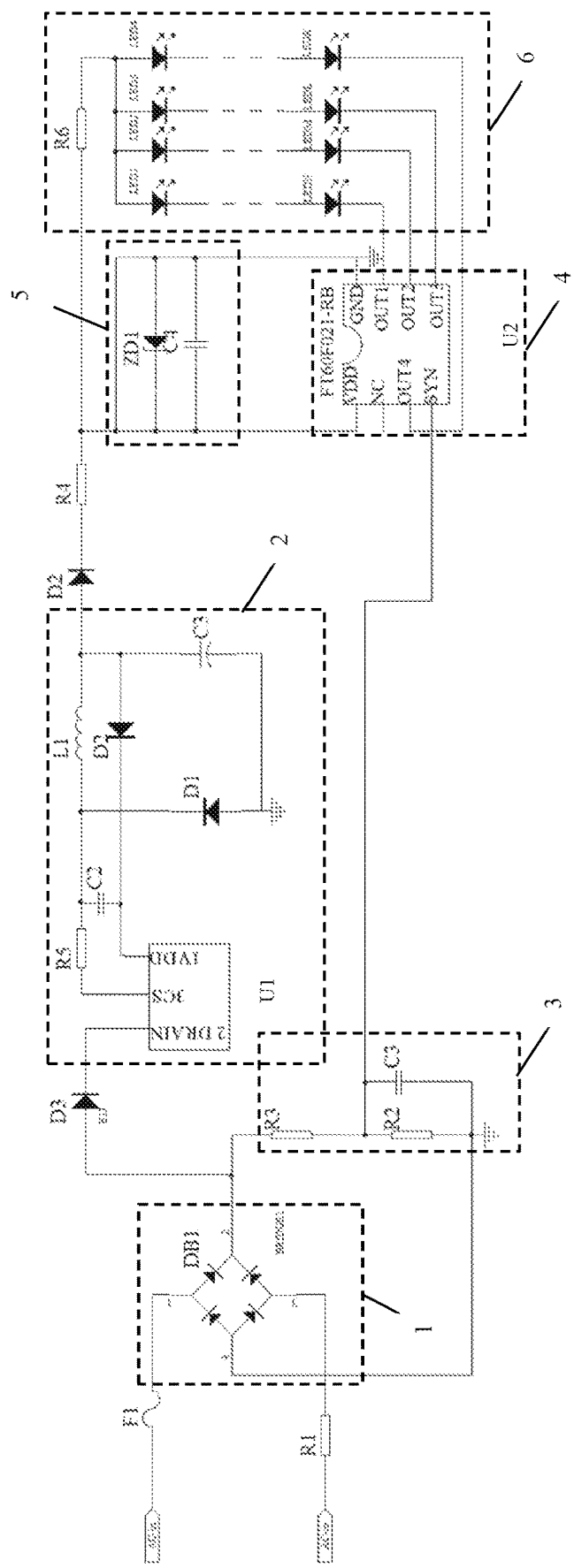
FIG. 2 is the brief circuitry diagram of a device according to one embodiment of the present disclosure.

Based on what was shown in FIG. 1, further referring to FIG. 2, a fuse F1 and a current-limiting resistor R1 are respectively connected to the live line and the neutral line between the external power supply and the rectifier unit 1. The rectifier unit 1 is a rectifier bridge DB1, and a first pin 1 and a third pin 3 of the rectifier bridge DB1 are respectively connected to the live line and the neutral line of the external power supply. Two ends of the fuse F1 are connected to a line connecting the first pin 1 of the rectifier bridge DB1 and the external power supply. Two ends of the current-limiting resistor R1 are connected to a line connecting the third pin 3 of the rectifier bridge DB1 and the external power supply. A fourth pin 4 of the rectifier bridge DB1 is grounded, and a second pin 2 of the rectifier bridge DB1 is respectively connected to the DC-DC unit and the signal sampling unit.

As a preferred embodiment of the DC-DC unit 2, preferably, the DC-DC unit 2 includes a chip U1, a resistor R5, a capacitor C2, an inductor L1, a diode D1, a diode D2, and an electrolytic capacitor C3. A first pin VDD of the chip U1 is connected to a first terminal of the capacitor C2 and a cathode of the diode D2, a second pin DRAIN of the chip U1 is connected to the second pin of the rectifier bridge DB1, a third pin 3 CS of the chip U1 is connected to a first terminal of the resistor R5, and a second terminal of the resistor R5 is respectively connected to a second terminal of the capacitor C2, a first terminal of the inductor L1, and a cathode of the diode D1. An anode of the diode D1 and a cathode of the electrolytic capacitor C3 are both grounded, and an anode of the diode D2 and an anode of the electrolytic capacitor C3 are connected to a second terminal of the inductor L1. The second terminal of the inductor L1 is also connected with the MCU power supply unit and the LED assembly.

In the present embodiment, the DC-DC unit 2 is mainly used to supply power for the MCU power supply unit 5 and the LED assembly 6. By providing the DC-DC unit 2, the device of the present disclosure may better adapt to a wider range of voltage, because the DC-DC unit can provide a constant output voltage even though the input AC power varies in a wider range, so as to stabilize power supply for subsequent units and components.

In addition, in order to prevent crosstalk, in the present embodiment, the line connecting the DC-DC unit 2 to the MCU power supply unit 5 and the LED assembly 6 is also provided with a diode D4 and a resistor R4, successively. An anode of the diode D4 is connected to the DC-DC unit 2, a cathode of the diode D4 is connected to a first terminal of the resistor R4, and a second terminal of the resistor R4 is connected to the MCU power supply unit 5 and the LED assembly 6, respectively. In addition, as a preferred embodiment, preferably, a diode D3 is further provided between the DC-DC unit and the rectifier unit. An anode of the diode D3 is connected to the second pin 2 of the rectifier bridge DB1 of the rectifier unit, and a cathode of the diode D3 is connected to the second pin DRAIN of the chip U1 of the DC-DC unit 2. It should be understood that the present disclosure is not limited thereto, in other possible implementations, the diode D3 can also be omitted. Further, the effect of preventing crosstalk by the diode D3 and diode D4 is realized based on the unidirectional conductivity characteristic of diodes, and its specific mechanism is common knowledge in the art, which will not be repeated herein for the sake of simplicity. The design is different than the conventional one in that the diode is configured between certain modules to prevent crosstalk of signal.

As a preferred embodiment of the control unit 4 and the MCU power supply unit 5, preferably, the control unit 4 includes a control chip U2, and the MCU power supply unit 5 includes a zener diode ZD1 and a capacitor C4. A first pin VDD of the control chip U2, a cathode of the zener diode ZD1 and a first terminal of the capacitor C4 are all connected to the second terminal of the resistor R4. A second pin GND of the control chip U2, an anode of the zener diode ZD1 and a second terminal of the capacitor C4 are all grounded. The second terminal of the resistor R4 is also grounded. In addition, a third pin SYN of the control chip U2 is connected to the signal sampling unit, the control chip U2 further includes an output pin, and the control chip is connected to the LED assembly through the output pin.

As a preferred embodiment of the signal sampling unit 3, preferably, the signal sampling unit includes a resistor R2, a resistor R3 and a capacitor C3. A first terminal of the resistor R3 is connected to the second pin 2 of the rectifier bridge DB1. A second terminal of the resistor R3, a first terminal of the resistor R2, and a first terminal of the capacitor C3 are all connected to the third pin SYN of the control chip U2. A second terminal of the resistor R2 and a second terminal of the capacitor C3 are both grounded.

In terms of the LED assembly 6, as an optional implementation of the LED assembly 6, the LED assembly 6 may include a plurality of LED units. A first end of each LED unit is connected to the second terminal of the resistor R4. In addition, a second end of each LED unit is connected to the control chip U1. In order to facilitate the synchronous control of the LED assembly, a quantity of the output pin of the control chip U2 is the same as a quantity of the LED unit, and the output pin is connected to the LED unit in a one-to-one correspondence. According to the present embodiment, FIG. 2 shows an LED assembly including four LED units, and each LED unit is composed of a plurality of LED sub-units (i.e. LED bulbs) connected in series. In order to facilitate the control of the four LED units, in the present embodiment, the output pins of the control chip U2 include pin OUT1, pin OUT2, pin OUT3 and pin OUT4 which are respectively connected with the second ends of the four LED units.

In terms of the color matching of the LED units, according to the present embodiment, the LED units may be single-color LED units or mixed-color LED units, the mixed LED units may be RGB color LED units or RGBW color LED units, and each LED unit may include more than one LED sub-unit. The plurality of LED units of the LED assembly 6 may be connected in series, parallel or in combination of both.

Additionally, the LED assembly 6 may further include a resistor R6, a first terminal of the resistor R6 is respectively connected to the first end of each LED unit, and a second terminal of the resistor R6 is connected to the second terminal of the resistor R4.

In terms of the model selection of the chip U1 and chip U2, according to the present embodiment, the product model of the chip U2 may be FT60F021-RB.

By providing the DC-DC unit 2, the device of the present disclosure may better adapt to a wider range of voltage, because the DC-DC unit can provide a constant output voltage even though the input AC power varies in a wider range, so as to stabilize power supply for subsequent units and components. Compared with the traditional solution, the present disclosure allows the LED assembly 6 to include more LED units connected in parallel. However, in the traditional solution, the length of the LED units and its LED sub-units (i.e. the LED bulbs) is limited, beyond the length threshold, the more the LED bulbs are connected in parallel, the higher the voltage drop of the later LED bulbs, thus affecting the effective control of the LED assembly by the LED bulb control device and response efficiency of the control. By configuring the DC-DC unit, the present disclosure allows more LED bulbs to be connected in parallel and increases the length of the LED assembly.

Based on the above, the working principle of the LED bulb control device of this embodiment is described below.

According to the present embodiment, the control signal input is monitored by detecting the value of the dividing voltage of resistor R3 and resistor R2 by the pin SYN of the control chip U2.

When the external controller is not connected to the device by the user, the signal sampling unit 3 counts a number of changes in a cycle and a cycle length of the alternating current to provide synchronous signal to the pin SYN of the control chip U2, and the pin SYN of the control chip U2 will automatically detect and determine the periodic frequency of the AC input signal to achieve synchronous control of the LED units on the same line.

When the external controller is connected, the signal sampling unit 3 acquires control signal and send it to the pin SYN of the control chip U2, the pin SYN of the control chip U2 will automatically detect and identify the function of the control signal, and can automatically identify the output signal of the external controller, so as to share the same control unit 4 with the LED unit and achieve unified synchronous control of the color change of the LED units.

Figure 3:
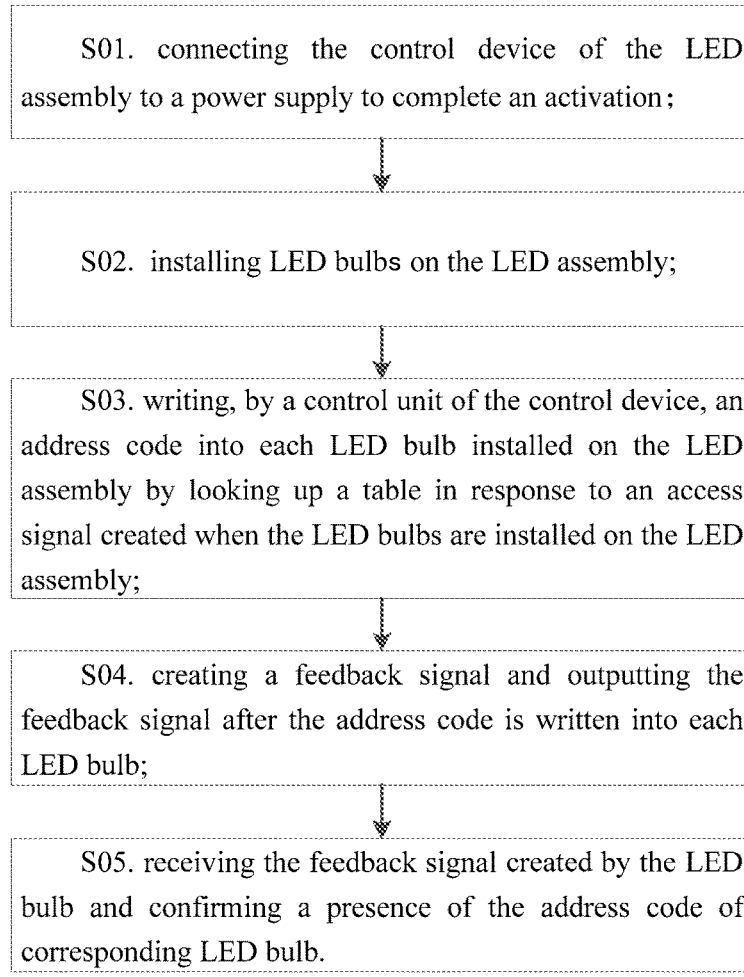
FIG. 3 is a flow chart of the LED bulb address programming method according to one embodiment of the present disclosure.

As shown in FIG. 3, based on the above-mentioned hardware structure, the present disclosure also provides an LED bulb address programming method, which is applied to an LED assembly having more than one LED bulb, the LED assembly is connected with a control device, and the LED bulb address programming method includes the following steps:

S01. connecting the control device of the LED assembly to a power supply to complete an activation;

S02. installing LED bulbs on the LED assembly;

S03. writing, by a control unit of the control device, an address code into each LED bulb installed on the LED assembly by looking up a table in response to an access signal created when the LED bulb(s) is/are installed on the LED assembly;

S04. creating a feedback signal and outputting the feedback signal after the address code is written into each LED bulb;

S05. receiving the feedback signal created by the LED bulb and confirming a presence of the address code of corresponding LED bulb.

The purpose of confirming the presence of the address code of corresponding LED bulb is to record the successful writing of the address code of the LED bulb, and to update the address codes of the newly installed LED bulbs into the control program.

According to the present embodiment, as a preferred implementation, preferably, an address code table is pre-recorded in the control unit, the address codes are correspondingly written into the LED bulbs according to the loading sequence of the LED bulbs. In other words, information related to the address table is input into the control unit 4 beforehand, and the address codes are allocated to the loaded LED bulbs by successively outputting the address codes. It should be noted that the allocation sequence here is in line with the installation sequence of LED bulbs, and the installation sequence of the LED bulbs does not necessary mean the regular and consecutive sequence. The LED bulbs can be installed in a randomly selected place, and the control unit 4 successively allocates address codes to the LED bulbs by looking up the table. In addition, in response to the access signal indicating that the LED bulbs are installed on the LED assembly, the control unit also acquires whether the corresponding LED bulbs have an address code or not. In other words, the control unit detects whether the LED bulb has been written with an address code beforehand, if yes, erase it, and then sequentially allocate and write the address codes to the LED bulb by looking up the table, otherwise, allocate and write the address codes to the LED bulbs successively by looking up the table.

In this case, as a preferred embodiment, preferably, when the LED bulb has been written with an address code beforehand, it should be a rewritable LED bulb, when the LED bulb has no pre-written address code, the address codes of the LED bulbs can only be written once or rewritable.

Since the lifespan of LED bulbs is restricted, one or more LED bulbs may fail after the LED assembly is used for a period of time. In this case, maintenance personnel usually needs to replace the faulty bulbs. When the old LED bulb is removed and replaced with a new LED bulb, there may be a change in the LED bulb's address code. In case that the address code of the new LED bulb is not the same as the old one, the program of the control unit of the LED assembly needs to be updated, especially commands related to addresses need to be adjusted accordingly, so as to keep pace with other bulbs after the replacement with new LED bulb. However, this method is relatively inefficient. In order to improve user-friendliness and reduce the chance to adjust the program of the control unit as much as possible, the present disclosure further provides a mechanism that can reserve the address codes for LED bulbs after replacement, so that the new LED bulbs can be used directly, details of the mechanism are described below.

A method for replacing an LED bulb, including the following steps:

(1) receiving a feedback signal indicating that an old LED bulb is removed from the LED assembly;

(2) in response to a reception of the feedback signal, acquiring an address code of the old LED bulb and reserving the address code for a predetermined duration;

(3) installing a new LED bulb on the LED assembly in a one-to-one correspondence with the old LED bulb, wherein the control unit of the control device writes the reserved address code of the old LED bulb into the corresponding new LED bulb in response to an access signal indicating that the new LED bulb is installed on the LED assembly;

(4) creating a feedback signal and outputting the feedback signal after a completion of writing the reserved address code into the new LED bulb;

(5) receiving the feedback signal created by the new LED bulb and confirming a presence of the address code of corresponding new LED bulb.

According to the above method, the faulty LED bulb is removed and new LED bulb is installed carrying the address code of the removed LED bulb. By doing so, a seamless transition of the new LED bulb installed on the LED assembly can be obtained to get ready for direct use without the need to update the control program of the LED assembly, thereby improving the efficiency of the LED bulb maintenance.

Additionally, in step (3), in response to the access signal indicating that the new LED bulb (the LED bulb for replacement of the faulty LED bulb) is installed on the LED assembly, the control unit also acquires the address code of the new LED bulb if it has one. Namely, the control unit will check whether the LED bulb has an address code that is written beforehand, if yes, the address code will be erased and the LED bulbs will each be assigned and written an address code successively by looking up a table. Otherwise, the LED bulbs will each get an address code directly and successively by looking up the table. In this case, when the LED bulb is written with an address code beforehand, the LED bulb should allow address code rewriting. While, for LED bulbs have no address code written beforehand, the LED may either allow address code only be written once or allow address code rewriting.

Figure 4:
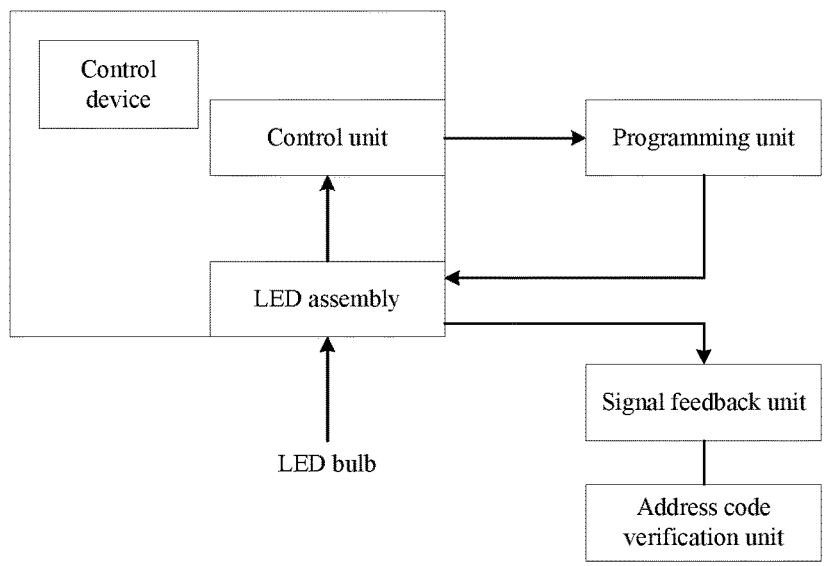
FIG. 4 is a schematic diagram briefly showing connection relationship of various module units of an LED bulb address programming system according to one embodiment of the present disclosure.

As shown in FIG. 4, based on the above-mentioned LED bulb address programming method, the present disclosure also provides an LED bulb address programming system, which includes:

a control device, configured to be connected to the LED assembly and connected to an external power supply, wherein to write the address code to the LED bulb, the control device is connected to the external power supply to complete an activation;

a control unit, integrated on or connected to the control device, configured to respond to an access signal indicating that the LED bulb is installed on the LED assembly;

a programming unit, configured to write an address code in the LED bulb installed on the LED assembly by looking up a table;

a signal feedback unit, configured to create and output a feedback signal after the address code is written into the LED bulb; and an address code verification unit, configured to receive the feedback signal created by the LED bulb and confirm a presence of address code of corresponding LED bulb.

In addition, various functional units in each embodiment of the present disclosure may be integrated on one processing unit, or the various units may be physically independent, or two or more units may be integrated on one unit. The above-mentioned integrated units may be implemented in the form of hardware, or may be implemented in the form of software units.

The integrated unit, if implemented as a software functional unit and sold or used as an independent product, may be stored in a computer-readable storage medium. Based on this understanding, the technical solution of the present disclosure or the part that contributes to the prior art, or all or part of the technical solution can be embodied in the form of a software product, and the computer software product is stored in a storage medium, including several instructions to make a computer device (which may be a personal computer, a server, or a network device, etc.) or a processor to execute all or part of the steps of the methods in the various embodiments of the present disclosure. The aforementioned storage medium includes: USB flash drive, mobile hard disk, read-only memory (ROM), random access memory (RAM), magnetic disk or optical disk and other media that can store program codes.

Embodiment 2

Figure 5:
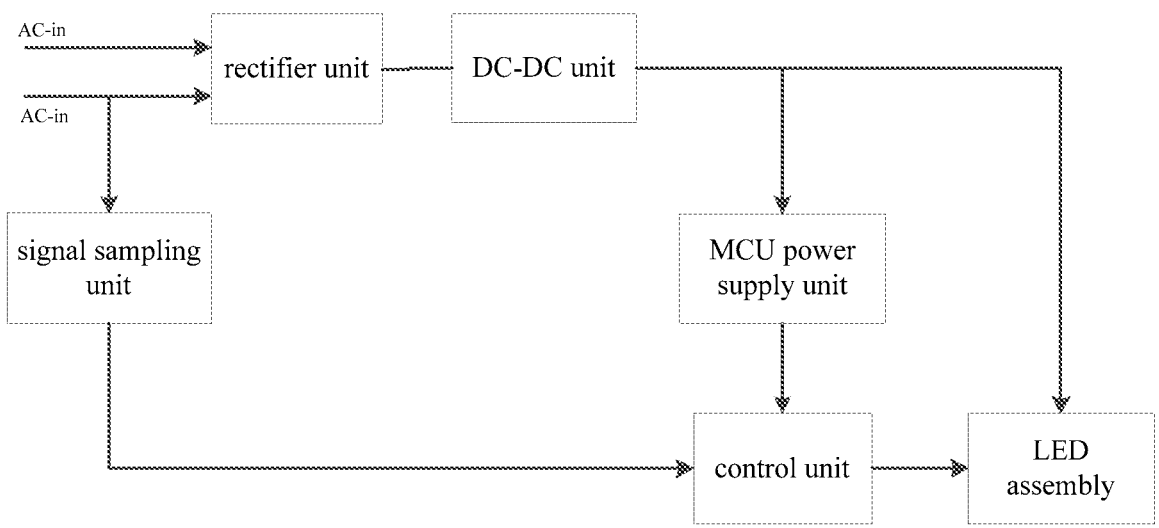
FIG. 5 is a schematic diagram briefly showing the connection relationship of various units of a device according to one embodiment of the present disclosure.

As shown in FIG. 5, this embodiment is basically the same as Embodiment 1, and the difference is that in this embodiment, the synchronization signal and control signal sampling unit is directly connected to the external power supply for counting the number of changes in a cycle and obtain a cycle length of the alternating current or the control signal pulses to provide synchronization signals and acquire control signals input by the external controller.

The rest of the connection relations and general control mechanism of this embodiment are substantially the same as those of Embodiment 1, and will not be repeated hereinafter.

The above descriptions merely include part of the embodiments of the present disclosure, and the scope of protection of the present disclosure is not limited to these embodiments. Any equivalent device or equivalent process transformation made based on the content of the description and drawings of the present disclosure, or direct or indirect application of the present disclosure to other related technical fields should be considered as fall within the scope of the present disclosure.

What is claimed is:

1. An LED bulb control device, comprising:
   a rectifier unit, connected to a live line and a neutral line of an external power supply, wherein the rectifier unit is configured to convert an alternating current into a direct current;
   a DC-DC unit, connected to the rectifier unit;
   a signal sampling unit, connected to the rectifier unit or the external power supply for counting a number of changes in a cycle and a cycle length of the alternating current or a control signal pulse to provide a synchronization signal and acquire a control signal input by an external controller;
   a control unit, connected to the signal sampling unit for receiving the synchronization signal and/or the control signal output by the signal sampling unit;
   a MCU power supply unit, connected to the DC-DC unit and the control unit respectively for supplying power to the control unit; and
   an LED assembly, wherein the LED assembly includes one or more LED units, the LED assembly is connected to the DC-DC unit and the control unit respectively, and is controlled by the control unit.

2. The LED bulb control device according to claim 1, wherein a fuse F1 and a current-limiting resistor R1 are respectively connected to the live line and the neutral line between the external power supply and the rectifier unit; the rectifier unit is a rectifier bridge DB1, and a first pin and a third pin of the rectifier bridge are respectively connected to the live line and the neutral line of the external power supply;

two ends of the fuse F1 are connected to a line connecting the first pin of the rectifier bridge DB1 and the external power supply;

two ends of the current-limiting resistor R1 are connected to a line connecting the third pin of the rectifier bridge DB1 and the external power supply;

a fourth pin of the rectifier bridge DB1 is grounded, and a second pin of the rectifier bridge DB1 is respectively connected to the DC-DC unit and the signal sampling unit.

3. The LED bulb control device according to claim 2, wherein the DC-DC unit comprises a chip U1, a resistor R5, a capacitor C2, an inductor L1, a diode D1, a diode D2, and an electrolytic capacitor C3;

a first pin VDD of the chip U1 is connected to a first terminal of the capacitor C2 and a cathode of the diode D2, a second pin DRAIN of the chip U1 is connected to the second pin of the rectifier bridge DB1, a third pin CS of the chip U1 is connected to a first terminal of the resistor R5, and a second terminal of the resistor R5 is respectively connected to a second terminal of the capacitor C2, a first terminal of the inductor L1, and a cathode of the diode D1;

an anode of the diode D1 and a cathode of the electrolytic capacitor C3 are both grounded, and an anode of the diode D2 and an anode of the electrolytic capacitor C3 are connected to a second terminal of the inductor L1, the second terminal of the inductor L1 is also connected with the MCU power supply unit and the LED assembly.

4. The LED bulb control device according to claim 1, wherein the line connecting the DC-DC unit to the MCU power supply unit and the LED assembly is also provided with a diode D4 and a resistor R4, successively;

wherein, an anode of the diode D4 is connected to the DC-DC unit, a cathode of the diode D4 is connected to a first terminal of the resistor R4, and a second terminal of the resistor R4 is connected to the MCU power supply unit and the LED assembly, respectively.

5. The LED bulb control device according to claim 4, wherein the control unit comprises a control chip U2, and the MCU power supply unit comprises a zener diode ZD1 and a capacitor C4;

wherein, a first pin VDD of the control chip U2, a cathode of the zener diode ZD1 and a first terminal of the capacitor C4 are all connected to the second terminal of the resistor R4, a second pin GND of the control chip U2, an anode of the zener diode ZD1 and a second terminal of the capacitor C4 are all grounded, and the second terminal of the resistor R4 is also grounded;

a third pin SYN of the control chip U2 is connected to the signal sampling unit, the control chip U2 further comprises an output pin, and the control chip is connected to the LED assembly through the output pin; and the signal sampling unit comprises a resistor R2, a resistor R3 and a capacitor C3, wherein a first terminal of the resistor R3 is connected to the second pin of the rectifier bridge DB1, a second terminal of the resistor R3, a first terminal of the resistor R2, and a first terminal of the capacitor C3 are all connected to the third pin SYN of the control chip U2, a second terminal of the resistor R2 and a second terminal of the capacitor C3 are both grounded.

6. The LED bulb control device according to claim 5, wherein the LED assembly comprises a plurality of LED units, a first end of each LED unit is connected to the second terminal of the resistor R4, and a second end of each LED unit is connected to the control chip U2;

a quantity of the output pin of the control chip U2 is the same as a quantity of the LED unit, and the output pin is connected to the LED unit in a one-to-one correspondence; and the LED units are single-color LED units or mixed-color LED units, the mixed-color LED units are RGB color LED units or RGBW color LED units, and each LED unit comprises more than one LED sub-unit; and the plurality of LED units of the LED assembly are connected in series, parallel or in combination of both.

7. The LED bulb control device according to claim 6, wherein a diode D3 is further provided between the DC-DC unit and the rectifier unit, an anode of the diode D3 is connected to the second pin of the rectifier bridge DB1 of the rectifier unit, and a cathode of the diode D3 is connected to the second pin DRAIN of the chip U1 of the DC-DC unit; and the LED assembly further comprises a resistor R6, a first terminal of the resistor R6 is respectively connected to the first end of each LED unit, and a second terminal of the resistor R6 is connected to the second terminal of the resistor R4.

8. An LED bulb address programming method for an LED assembly having more than one LED bulb, the LED assembly is connected with a control device, and the LED bulb address programming method includes the following steps:

connecting the control device of the LED assembly to a power supply to complete an activation;

installing LED bulbs on the LED assembly;

writing, by a control unit of the control device, an address code into each LED bulb installed on the LED assembly by looking up a table in response to an access signal created when the LED bulbs are installed on the LED assembly;

creating a feedback signal and outputting the feedback signal after the address code is written into each LED bulb;

receiving the feedback signal created by the LED bulb and confirming a presence of the address code of corresponding LED bulb.

9. The LED bulb address programming method according to claim 8, wherein an address code table is pre-recorded in the control unit, and address codes are correspondingly written into the LED bulbs according to a loading sequence of the LED bulbs, the address codes of the LED bulbs can only be written once or rewritable.

10. A computer-readable storage medium, wherein the storage medium stores at least one instruction, one piece of program, one code set, or instruction set, and the at least one instruction, one piece of program, one code set, or instruction set is loaded and executed by a processor to implement the LED bulb address programming method according to claim 8.

* * * * *